United States Patent [19]

Fujiwara et al.

[11] Patent Number: 4,984,484
[45] Date of Patent: Jan. 15, 1991

[54] HYDRAULIC CONTROL SYSTEM FOR AUTOMATIC TRANSMISSION

[75] Inventors: Takuji Fujiwara; Hiroshi Yoshimura; Kozo Ishii; Kazuo Takemoto, all of Hiroshima, Japan

[73] Assignee: Mazda Motor Corporation, Shinchi, Japan

[21] Appl. No.: 413,972

[22] Filed: Sep. 28, 1989

[30] Foreign Application Priority Data

Sep. 30, 1988 [JP] Japan .................. 63-246253

[51] Int. Cl.⁵ .................................. B60K 41/18
[52] U.S. Cl. ................................... 74/866
[58] Field of Search ......................... 74/866

[56] References Cited

U.S. PATENT DOCUMENTS 4,450,941 5/1984 Morris .................. 192/3.31

FOREIGN PATENT DOCUMENTS 6213848 1/1987 Japan .

*Primary Examiner*—Dirk Wright
*Attorney, Agent, or Firm*—Sixbey, Friedman, Leedom & Ferguson

[57] ABSTRACT

An automatic transmission of a vehicle has a transmission gear mechanism having at least a lower gear-speed and a higher gear-speed, and first and second friction coupling members which are applied or released by hydraulic pressures applied thereto. The first friction coupling member is kept applied when the transmission is in the lower gear-speed and the second friction coupling member is kept applied when the transmission is in the higher gear-speed. A control system for the automatic transmission has a hydraulic control circuit which controls the hydraulic pressure applied to the respective friction coupling members, thereby changing the condition of application of the friction coupling members and causing the automatic transmission to shift, and a control unit which controls the hydraulic control circuit according to the running condition of the vehicle. The control unit normally makes lower the hydraulic pressure applied to the second friction coupling member when it is kept applied than that applied to the first friction coupling member when it is kept applied by a predetermined value. When the vehicle is starting with the transmission in the higher gear-speed, the control unit inhibits itself from making lower the hydraulic pressure applied to the second friction coupling member when it is kept applied than that applied to the first friction coupling member when it is kept applied.

4 Claims, 10 Drawing Sheets

FIG. 5 D RANGE – POWER MODE

HYDRAULIC CONTROL SYSTEM FOR AUTOMATIC TRANSMISSION

BACKGROUND OF THE INVENTION

1. Field of the Invention

This invention relates to a hydraulic control system for an automatic transmission.

2. Description of the Prior Art

An automatic transmission generally comprises a transmission gear mechanism, and a hydraulic control system including a hydraulic control circuit which controls the hydraulic pressure fed to or discharged from friction coupling members of the transmission gear mechanism, thereby changing the power transmission path of the transmission gear mechanism and causing the automatic transmission to shift, and a control means which controls the hydraulic control circuit according to the running condition of the vehicle so that the transmission automatically shifts to a desired gear speed.

As disclosed, for instance, in Japanese Unexamined Patent Publication No. 62(1987)-13848, there has been put into practice an automatic transmission in which a desired transmission control mode can be manually selected from a plurality of transmission control modes. The transmission control modes typically includes a power mode, an economy mode and a holding mode. In the power mode and the economy mode, the gear-shifting is effected on the basis of predetermined gear-shifting characteristic curves. The gear-shifting characteristic curves for the power mode are determined so that a better output performance can be obtained and those for the economy mode are determined so that a better fuel economy can be obtained.

When the holding mode is selected, the gear-speed is fixed to one set by the driver, generally a higher one, e.g., third in the case of D range, second in the case of 2 range and 1 range.

Further, in the automatic transmission disclosed in U.S. Pat. No. 4,450,941, the line pressure is reduced when the transmission is in a higher gear-speed so that the driving torque of the hydraulic pump is reduced since the transmitting torque of the transmission is small and accordingly the line pressure need not be high when the transmission is in a higher gear-speed. Such a control is generally called "cutback control".

When the cutback control is effected when the vehicle is started with the holding mode selected, the starting performance is deteriorated. That is, in the holding mode, the transmission is held in the higher gear-speed (e.g., second in D range) when the vehicle is started and accordingly, the line pressure is automatically reduced. In this state, the starting performance can be deteriorated due to slips at various parts of the transmission.

SUMMARY OF THE INVENTION

In view of the foregoing observations and description, the primary object of the present invention is to provide a hydraulic control system for an automatic transmission in which deterioration of the starting performance can be avoided while the advantages of the cutback control is held.

In accordance with the present invention, there is provided a hydraulic control system for an automatic transmission of a vehicle which has a transmission gear mechanism having at least a lower gear-speed and a higher gear-speed, and first and second friction coupling members which are applied or released by hydraulic pressures applied thereto, the first friction coupling member being kept applied when the transmission is in the lower gear-speed and the second friction coupling member being kept applied when the transmission is in the higher gear-speed, the control system including a hydraulic control circuit which controls the hydraulic pressure applied to the respective friction coupling members, thereby changing the condition of application (applied or released) of the friction coupling members and causing the automatic transmission to shift and a control means which controls the hydraulic control circuit according to the running condition of the vehicle, characterized in that said control means includes an application pressure changing means which makes lower the hydraulic pressure applied to the second friction coupling member when it is kept applied than that applied to the first friction coupling member when it is kept applied by a predetermined value, a detecting means which detects that the vehicle is starting with the transmission in the higher gear-speed, and an inhibiting means which inhibits the application pressure changing means from making lower the hydraulic pressure applied to the second friction coupling member when it is kept applied than that applied to the first friction coupling member when it is kept applied when the detecting means detects that the vehicle is starting with the transmission in the higher gear-speed.

DESCRIPTION OF THE PREFERRED EMBODIMENT

Figure 1:
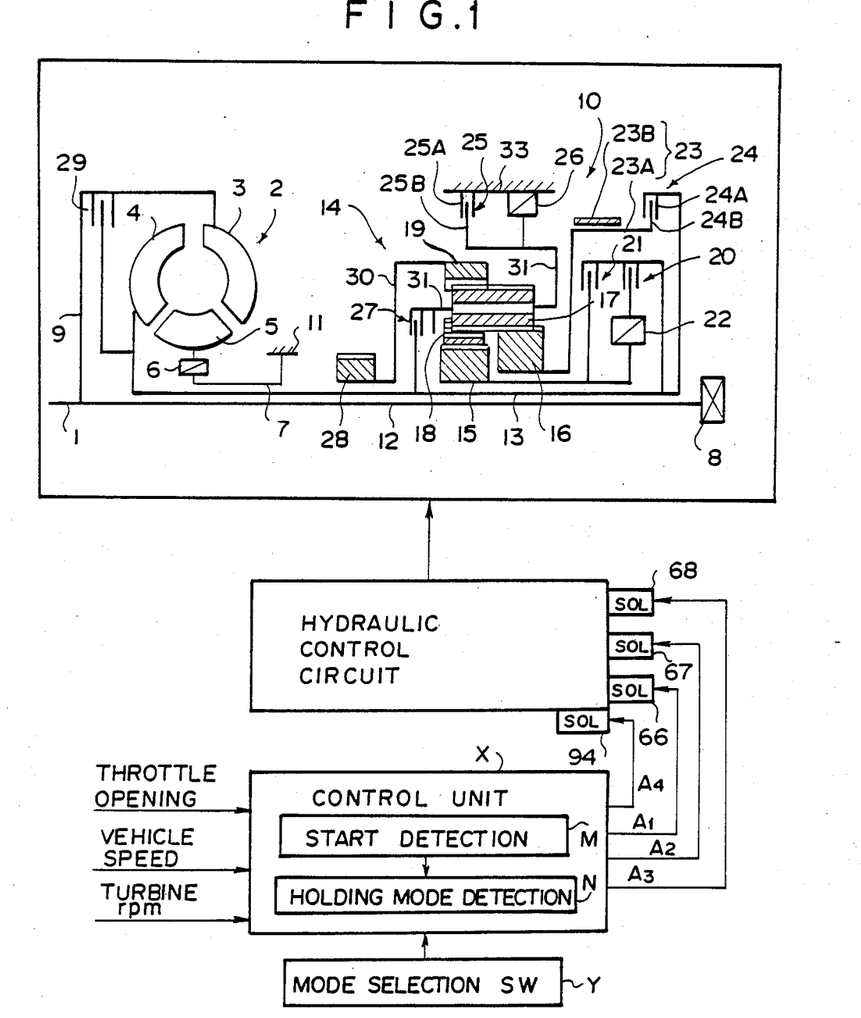
FIG. 1 is a schematic view showing an automatic transmission provided with a hydraulic control system in accordance with an embodiment of the present invention, FIG. 2, as divided into

In FIG. 1, an automatic transmission comprises a torque convertor 2, a transmission gear mechanism 10, and a hydraulic control system in accordance with an embodiment of the present invention. The hydraulic control system comprises a hydraulic control circuit which controls the condition of application of the friction coupling members of the transmission gear mechanism 10 and a control unit X which controls the hydraulic control circuit according to the running condition of the vehicle. The torque convertor 2 and the transmission gear mechanism 10 are coaxially connected to a crankshaft 1.

The torque convertor 2 comprises a pump 3, a turbine 4 and a stator 5. The pump 3 is fixed to the crankshaft 1 by way of a turbine cover 9, and the turbine 4 is fixed to a turbine shaft 13. The stator 5 is connected to a stationary shaft 7 by way of a one-way clutch 6. The stationary shaft 7 is integrally connected to a transmission casing 11. A lockup clutch 29 which directly connects the turbine shaft 13 and the crankshaft 1 is disposed between the turbine shaft 13 and the turbine cover 9.

The transmission gear mechanism 10 has a central shaft 12 which is connected to the crankshaft 1 at one end and is passed through the center of the transmission gear mechanism 10. An oil pump 8 is connected to the other end of the central shaft 12. The turbine shaft 13 is hollow and the central shaft 12 extends through the turbine shaft 13. The turbine shaft 13 is connected to the turbine 4 of the torque convertor 2 at one end and is connected for rotation to the side wall of the transmission at the other end. A planetary gear unit 14 is mounted on the turbine shaft 13. The planetary gear unit 14 comprises a small sun gear 15, a large sun gear 16, a long pinion gear 17, short pinion gears 18 and a ring gear 19.

A forward clutch 20 and a coast clutch 21 are disposed on the side of the planetary gear unit 14 remote from the crankshaft 1. The forward clutch 20 is connected to the small sun gear 15 by way of a first one-way clutch 22 and to the turbine shaft 13. The coast clutch 21 is connected between the small sun gear 15 and the turbine shaft 13 in parallel to the forward clutch 20.

A 2-4 brake 23 is disposed on the outer side of the coast clutch 21. The 2-4 brake comprises a brake drum 23A connected to the large sun gear 16 and a brake band 23B wrapped around the brake drum 23A. A reverse clutch 24 is connected between the turbine shaft 13 and the large sun gear 16. A low and reverse brake 25 is connected between a carrier 31 of the planetary gear unit 14 and a casing 33 of the transmission 10. A second one-way clutch 26 is connected between the carrier 31 and the casing 33 in parallel to the low and reverse brake 25.

A 3-4 clutch 27 is connected between the carrier 31 and the turbine shaft 13. An output gear 28 mounted on an output shaft 30 is connected the ring gear 19.

The automatic transmission shown in FIG. 1 has four forward speeds and one reverse speed.

When the transmission is in first, the forward clutch 20 is applied and the first and second one-way clutches 22 and 26 are locked. This causes the output of the torque convertor 2 to be transmitted to the small sun gear 15 from the turbine shaft 13 by way of the forward clutch 20 and the first one way clutch 22. In this case, the carrier 31 is held stationary by the second one-way clutch 26, and accordingly, the transmission gear mechanism 10 acts as a solid gear train in which the rotation is transmitted from the small sun gear 15 to the ring gear 19 by way of the short pinion gears 18 and the long pinion gear 17. At this time, the gear speed corresponds to the ratio of the diameter of the small sun gear 15 to the diameter of the ring gear 19.

When the 2-4 brake 23 is applied to hold stationary the large sun gear 32 and the second one-way clutch 26 is released with the clutches and the brakes in the condition where the transmission is in first, the automatic transmission is shifted to second. In this state, the rotation transmitted to the small sun gear 15 from the turbine shaft 13 is transmitted to the long pinion gear 17 by way of the short pinion gears 18, and the long pinion gear 17 moves around the large sun gear, thereby rotating the carrier 31.

When the 2-4 brake 23 is released and the 3-4 clutch 27 is applied with the clutches and the brakes in the condition where the transmission is in second, the automatic transmission is shifted to third. In this state, the rotation of the turbine shaft 13 is simultaneously transmitted to the small sun gear 15 by way of a forward clutch 20 and the first one-way clutch 22 and to the carrier 31 by way of the 3-4 clutch 27. In this state, the whole transmission gear mechanism 10 is rotated as a solid body and the ring gear 19 is rotated at the same speed as the turbine shaft 13.

When the automatic transmission is to be shifted to fourth, the 2-4 brake 23 which has been released when the transmission is shifted to third is applied again. In this state, the rotation of the turbine shaft 13 is transmitted to the carrier 31 by way of the 3-4 clutch 27 and the long pinion gear 17 is moved around the large sun gear 32. At this time, the large sun gear 32 is held by the 2-4 brake 23 and accordingly, the long pinion gear 17 is moved around the large sun gear 32 together with the carrier 31 while rotating about its axis. As a result, the ring gear 19 in mesh with the long pinion gear 17 is rotated at a speed equal to the sum of the rotational speed of the carrier 31 (i.e., the rotational speed of the turbine shaft 13) and the speed of the rotation of the long pinion gear 17 about its axis. In this case, though the forward clutch 20 has been applied, the rotation of the turbine shaft 13 cannot be transmitted to the small sun gear 15 since the first one-way clutch 22 has been released.

When the transmission is in R, the reverse clutch 24 and the low and reverse brake 25 are applied. In this state, the rotation of the turbine shaft 13 is transmitted to the large sun gear 32 and the carrier 31 is held stationary. Accordingly, the rotation is transmitted from the large sun gear 32 by way of the gear train which is in a solid state and includes the long pinion gear 17 and the ring gear 19. In this case the reduction gear ratio corresponds to the ratio of the diameter of the large sun gear 32 to the diameter of the ring gear 19. Further, the ring gear 19 is rotated in the direction opposite to the rotation of the turbine shaft 13 or the large sun gear 32.

The first one-way clutch 22 which transmits rotation when the transmission is in first, second or third and the second one-way clutch 26 which supports the counterforce when the transmission is in first idle when the vehicle is coasting. Accordingly, no engine brake effect can be obtained when the transmission is in such gear speeds. However, when the transmission is in third of D range, second or third of 2 range or first or second of 1 range, the coast clutch 21 which is connected in parallel to the first one-way clutch 22 is applied and when the transmission is in first of 1 range, the low and reverse clutch 26 which is connected in parallel to the second one-way clutch 26 is applied, whereby the engine brake effect can be obtained.

The relation between the conditions of application of the clutch and brakes 20 to 25 and the one-way clutches 22 and 26 and the gear speeds is shown in Table 1.

TABLE 1

| | CLUTCH | | | | BRAKE | | ONE-WAY CLUTCH | |
|---|---|---|---|---|---|---|---|---|
| RANGE | FORWARD (20) | COAST (21) | 3-4 (27) | REVERSE (24) | 2-4 (23) | LOW REVERSE (25) | 1-st (22) | 2-nd (26) |
| P | | | | | | | | |

TABLE 1-continued

| RANGE | CLUTCH | | | | BRAKE | | ONE-WAY CLUTCH | |
|---|---|---|---|---|---|---|---|---|
| | FORWARD (20) | COAST (21) | 3-4 (27) | REVERSE (24) | 2-4 (23) | LOW REVERSE (25) | 1-st (22) | 2-nd (26) |
| R | | | | O | | O | | |
| N | | | | | | | | |
| D | | | | | | | | |
| 1 | O | | | | | | O* | O* |
| 2 | O | | | | O | | O* | |
| 3 | O | O | O | | | | O* | |
| 4 | O | | O | | O | | | |
| 2 | | | | | | | | |
| 1 | O | | | | | | O* | O* |
| 2 | O | O | | | O | | O* | |
| 3 | O | O | O | | | | O* | |
| 1 | | | | | | | | |
| 1 | O | O | | | | O | O* | O* |
| 2 | O | O | | | O | | O* | |

*idle during coasting

Figure 2:
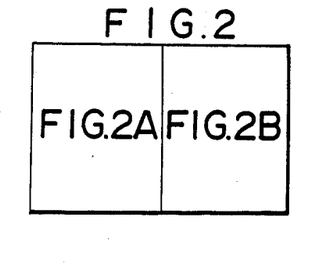
Figure 2A:
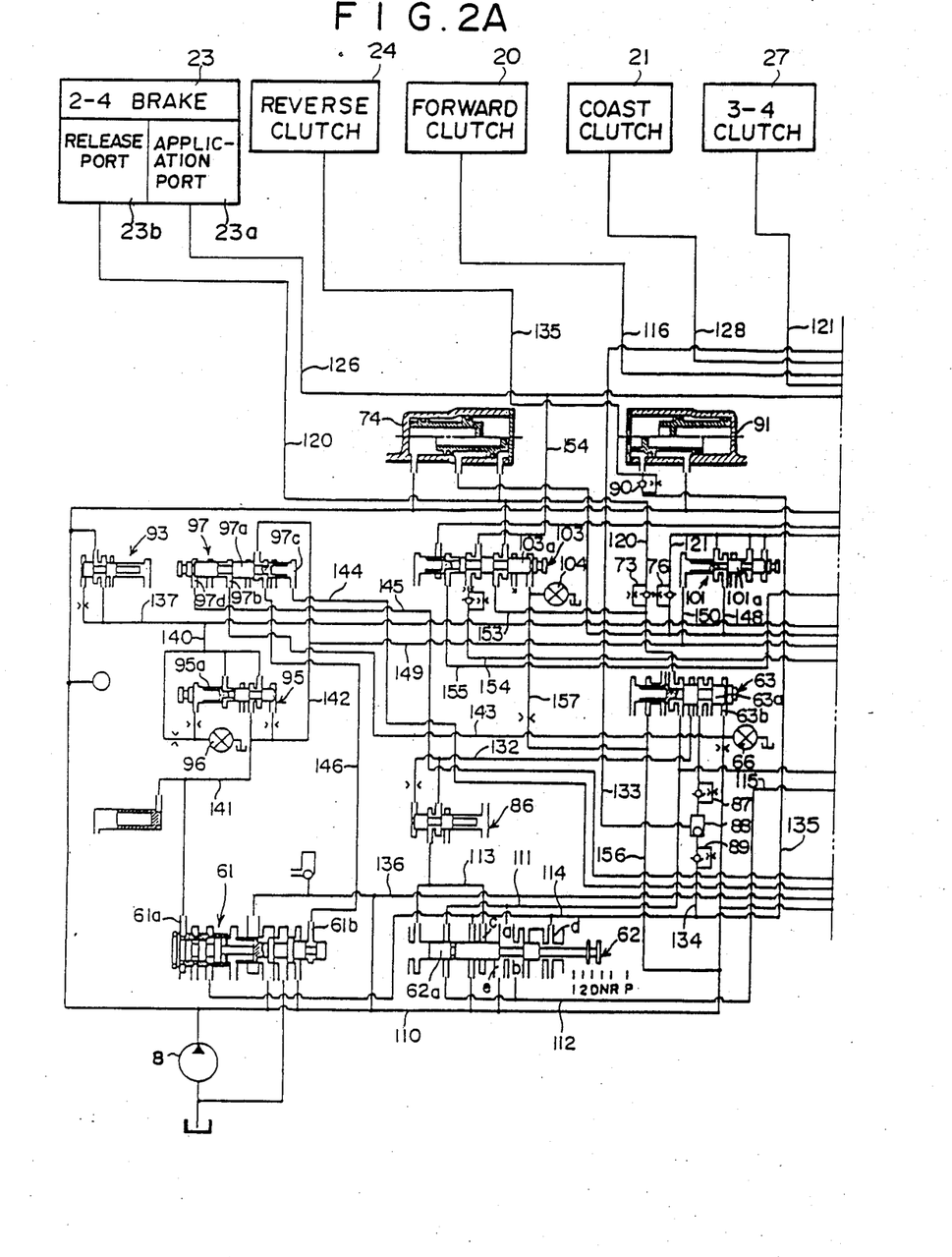
FIGS. 2A and 2B, is a circuit diagram of the hydraulic control circuit employed in the automatic transmission.
Figure 2B:
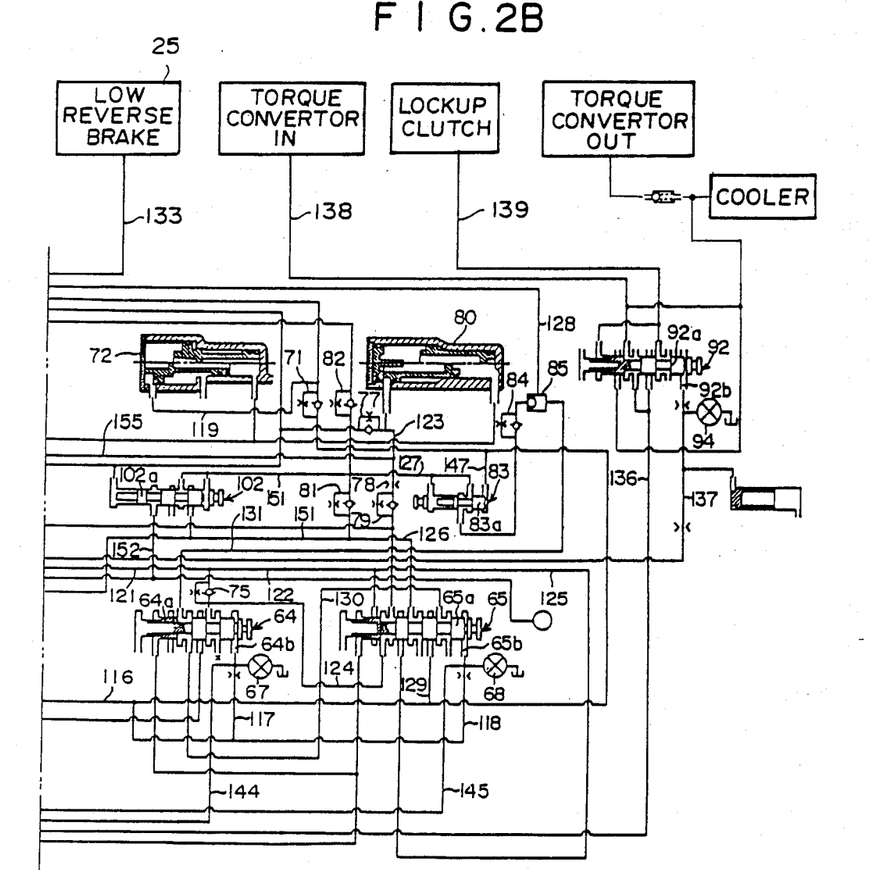

Now the hydraulic control circuit for controlling the hydraulic pressure to the actuators for the friction coupling members 20, 21, 23, 24, 25 and 27 will be described with reference to FIG. 2, hereinbelow.

The actuator for the 2-4 brake 23 comprises a servo piston mechanism having an application port 23a and a release port 23b. When the hydraulic pressure is applied to only the application port 23a, the actuator applies the 2-4 brake 23, and when the hydraulic pressure is applied to both the application port 23a and the release port 23b and when the hydraulic pressure is applied neither of the ports 23a and 23b, the actuator releases the same. Each of the actuators for the other friction coupling members 20, 21, 24, 25 and 27 comprises a hydraulic piston and applies the corresponding friction coupling member when the hydraulic pressure is applied thereto.

The hydraulic control circuit comprises a regulator valve 61 which regulates the pressure of the hydraulic oil discharged to a main line 110 from the oil pump 13 shown in FIG. 1, a manual valve 62 for selecting the driving range, and a 1-2 shift valve 63, a 2-3 shift valve 64 and a 3-4 shift valve 65 which respectively controls feed and discharge of the hydraulic pressure to and from the friction coupling members (or the actuators) 20, 21, 23 to 25 and 27.

The manual valve 62 has an input port e through which the line pressure is introduced from the main line 110 and first to fourth output ports a to d. When D range or 2 range is selected, the spool 62a is moved to a position where the input port e is communicated with the first and second output port a and b, when 1 range is selected, the spool 62a is moved to a position where the input port e is communicated with the first and third output ports a and c, and when R range is selected, the spool 62a is moved to a position where the input port e is communicated with the fourth port d. First to fourth output lines 111 to 114 are respectively connected to the first to fourth output ports a to d.

The shift valves 63 to 65 have spools 63a to 65a which are urged rightward by springs (not shown), and pilot ports 63b to 65b are respectively formed at portions opposed to the right ends of the spools 63a to 65a. To the pilot port 63b of the 1-2 shift valve 63 is connected a first pilotline 115 which is led from the main line 110. To the pilot ports 64b and 65b of the 2-3 shift valve 64 and the 3-4 shift valve 65 are respectively connected second and third pilot lines 117 and 118 which are led from the first output line 111 by way of a line 116. The pilot lines 115, 117 and 118 are respectively provided with first to third solenoid valves 66 to 68. When energized, the solenoid valves 66 to 68 respectively drain the corresponding pilotlines 115, 117 and 118 and remove the pilot pressures acting on pilot ports 63b to 65b, thereby permitting the spools 63a to 65a to slide rightward. While the solenoid valves 66 to 68 are not energized, the pilot pressure acting on the pilot ports 63b to 65b through the pilot lines 115, 117 and 118 hold the spools 63a to 65a in the left positions.

The solenoid valves 66 to 68 are turned on and off by a control signal which is output from the control unit X on the basis of a map which has been set in advance according to the vehicle speed and the throttle opening. In response to turning on and off the solenoid valves 66 to 68, the spools 63a to 65a of the shift valves 63 to 65 are moved and the hydraulic passages leading to the respective friction coupling members 20, 21, 23, 24, 25, and 27 are changed so that the friction coupling members are applied or released in the pattern shown in table 1. The combination patterns of on and off of the solenoid valves 66 to 68 and the gear speeds obtained are shown in table 2. When the transmission is shifted down from third to second, the combination pattern for second is obtained by way of the intermediate combination pattern shown in table 2.

TABLE 2

| | D | | | | | 2 | | | 1 | |
|---|---|---|---|---|---|---|---|---|---|---|
| | 1 | 2 | INTER-MEDIATE* | 3 | 4 | 1 | 2 | 3 | 1 | 2 |
| 1-st S.V. (66) | OFF | ON | ON | ON | ON | OFF | ON | ON | OFF | ON |
| 2-nd S.V. (67) | ON | ON | ON | OFF | OFF | ON | ON | OFF | ON | ON |
| 3-rd S.V. (68) | ON | ON | OFF | OFF | ON | ON | OFF | OFF | OFF | OFF |

TABLE 2-continued

| | | D | | | 2 | | | 1 | |
|---|---|---|---|---|---|---|---|---|---|
| | | INTER- | | | | 2 | | 1 | |
| 1 | 2 | MEDIATE* | 3 | 4 | 1 | 2 | 3 | 1 | 2 |
| (68) | | | | | | | | | |

*3-2 downshift

Said line 116 branches off from the first output line 111 which is communicated with the main line 110 when D, 2, or 1 range is selected, and is connected to the forward clutch 20 by way of a one-way orifice 71. Accordingly, in D, 2 and 1 range, the forward clutch 20 is normally applied. An N-D accummulator 72 for damping the shock upon application of the forward clutch 20 is connected to the forward clutch line 116 by way of a line 119.

The first output line 111 is led to the 1-2 shift valve 63 and is brought into communication with a servo application line 120 when the first solenoid valve 66 is turned on and the spool 63a is moved rightward. The servo application line 120 has a one-way orifice 73 and is connected to the application port 23a of the servo piston. Accordingly, when the selector lever is in D, 2 or 1 and the solenoid valve 66 is on (that is, second, third and fourth of D range, second and third of 2 range, second of 1 range), the servo application pressure is applied to the application port 23a. When the servo application pressure is applied to the application port 23a, the 2-4 brake 23 is applied so long as the hydraulic pressure (servo release pressure) is not applied to the release port 23b. An accummulator 74 for damping the shock upon application of the 2-4 brake 23 is connected to the servo application line 120.

The second output line 112 which is communicated with the main line when D or 2 range is selected is led to the 2-3 shift valve 64. The output line 112 is in communication with a 3-4 clutch line 121 by way of a one-way orifice 75 when the second solenoid valve 67 is off and the spool 64a is in the left position. The 3-4 clutch line 121 is led to the 3-4 clutch 27 by way of a one-way orifice 76. Accordingly, when the selector lever is in D or 2 and the solenoid valve 67 is turned on (that is, third and fourth of D range, third of 2 range), the 3-4 clutch 27 is applied.

First and second drain lines 122 and 123 branch off from the 3-4 clutch line 121. The first drain line 122 is led to the 3-4 shift valve 65, and is brought into communication with a line 124 and with the drain port of the 2-3 shift valve 64 when the third solenoid valve 68 is turned off. The second drain line 123 is also led to the 3-4 shift valve 65 by way of a one-way orifice 77, a fixed orifice 78 and another one-way orifice 79, and is brought into communication with the line 124 and with the drain port of the 2-3 shift valve 64 when the third solenoid valve 68 is turned on. That is, during either of the 3-2 downshift and the 4-2 downshift, the 3-4 clutch pressure is discharged, and in the case of the 3-2 downshift during which the third solenoid valve 68 is off in the intermediate pattern as shown in table 2, the 3-4 clutch pressure is discharged through the first drain line 122 while in the case of the 4-2 downshift during which which the third solenoid valve 68 is kept on, the 3-4 clutch pressure is discharged through the second drain line 123. A 2-3 accummulator 80 for damping the shock upon operation of the 3-4 clutch 27 is connected to the second drain line 123 between the one-way orifice 77 and the fixed orifice 78.

A line 125 is connected to the first drain line 122 and is brought into communication with the second output line 112 when the second solenoid valve 67 is turned off and the spool 64a of the 2-3 shift valve 64 is moved left. The line 125 is led to the 3-4 shift valve 65 and is brought into communication with a servo release line 126 when the third solenoid valve 68 is turned off and the spool 65a is moved left. The line 126 is led to the release port 23b of the servo piston by way of one-way orifices 81 and 82. Accordingly, when the solenoid valves 67 and 68 are both turned off while the selector lever is in D or 2 (that is, third of D range, third of 2 range), the servo release pressure is applied to the release port 23b of the servo piston and the 2-4 brake is released.

A line 127 branches off from the servo release line 126 at a portion between the one-way orifices 81 and 82 and is led to a coast clutch line 128 and to the coast clutch 21 by way of a coast control valve 83, a one-way orifice 84 and a ball valve 85. Accordingly, the coast clutch 21 is applied when the hydraulic pressure is introduced into the servo release line 126, that is, when the transmission is to be in third of D range or in third of 2 range. On the other hand, when the third solenoid valve 68 is off, that is, the spool 65a of the 3-4 shift valve 65 is in the left position, and at the same time the second solenoid valve 67 is on, that is, the spool 64a of the 2-3 shift valve 64 is in the right position, the forward clutch line 116 is communicated with a line 131 by way of a branch line 129, the 3-4 shift valve 65, a line 130 and a 2-2 shift valve 64. The line 131 is led to the coast clutch line 128 by way of the ball valve 85, and accordingly, the coast clutch 21 is also applied when the second solenoid valve 67 is on and the third solenoid valve 68 is off, that is, when the transmission is to be in second of 2 range or in first or second of 1 range.

The third output line 113 which is communicated with the main line 110 when 1 range is selected is led to the 1-2 shift valve 63 by way of a low reducing valve 86 and a line 132. The line 132 is communicated with a low and reverse line 133 and the low and reverse brake 25 by way of a one-way orifice 87 and a ball valve 88 when the first solenoid valve 66 is off and the spool 63a in the in left position. Accordingly, when 1 range has been selected and the first solenoid valve 66 is turned off, that is, when the transmission is to be in first of 1 range, the low and reverse brake 25 is applied.

The fourth output line 114 which is communicated with the main line 110 when R range is selected is further communicated with the low and reverse brake line 133 by way of a line which branches off from the line 114, a one-way orifice 89 and the ball valve 88. Further, the fourth ol 114 merges into a reverse clutch line 135 which is communicated with the reverse clutch 24 by way of a one-way orifice 90. Accordingly, when R range is selected the low and reverse brake 25 and the reverse clutch 24 are kept applied. An N-R accummulator 91 for damping the shock upon application of the reverse clutch 24 is connected to the reverse clutch line 135.

The hydraulic control circuit is further provided with a lockup valve 92 for actuating the lockup clutch 29 in the torque convertor 2. The lockup valve 92 is communicated with the regulator valve 61 by way of a torque convertor line 136, and a pilot line 137 is connected to a pilot port 92b of the lockup valve 92. The pilot line 137 branches off from the main line 110, and a hydraulic pressure reduced by solenoid reducing valve 93 is introduced into the pilot line 137. Further, the pilot line 137 is provided with a fourth solenoid valve 94 for lockup. When the fourth solenoid valve 94 is on and the spool 92a is in the right position, the torque convertor line 136 is communicated with a torque convertor in-line 138. This increases the inner pressure of the torque convertor 2 and applies the lockup clutch 29. On the other hand, when the fourth solenoid valve 94 is turned off and the spool 92a is moved leftward, the torque convertor 136 is communicated with a lockup release line 139 and a lockup release pressure is introduced into the torque convertor 2, whereby the lockup clutch 29 is released.

Further, the hydraulic control circuit is provided with a throttle modulator valve 95 for controlling the line pressure regulated by the regulator valve 61, a duty solenoid valve 96 for actuating the modulator valve 95, and a cutback valve 97.

The throttle modulator valve 95 is connected to a line 140 which branches off from the line 137 which is communicated with the main line 110 by way of the solenoid reducing valve 93. A pilot pressure which has been regulated by the duty solenoid valve 96 which periodically opens and closes is applied to one end of the spool 95a of the valve 95, and the throttle modulator valve 95 generates a throttle modulator pressure according to the duty ratio (the ratio of the valve opening time in one period) of the duty solenoid valve 96. The duty ratio is set according to the opening of the throttle valve of the engine, and the throttle modulator pressure corresponding to the duty ratio is applied to a booster port 61a of the regulator valve 61 by way of a line 141, whereby the regulated line pressure is boosted with increase in the throttle opening.

Figure 3:
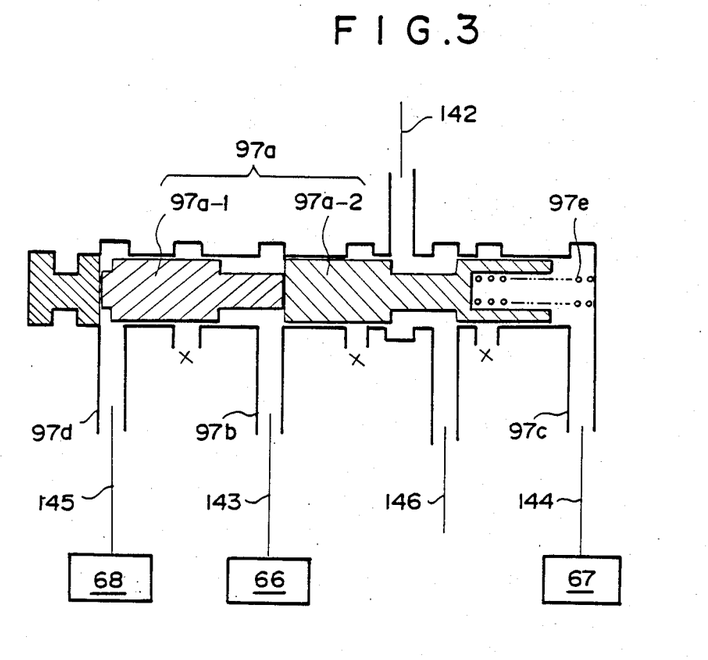
FIG. 3 is a schematic showing the cutback valve employed in the hydraulic control circuit and the connection of the same to the circuit.
Figure 4:
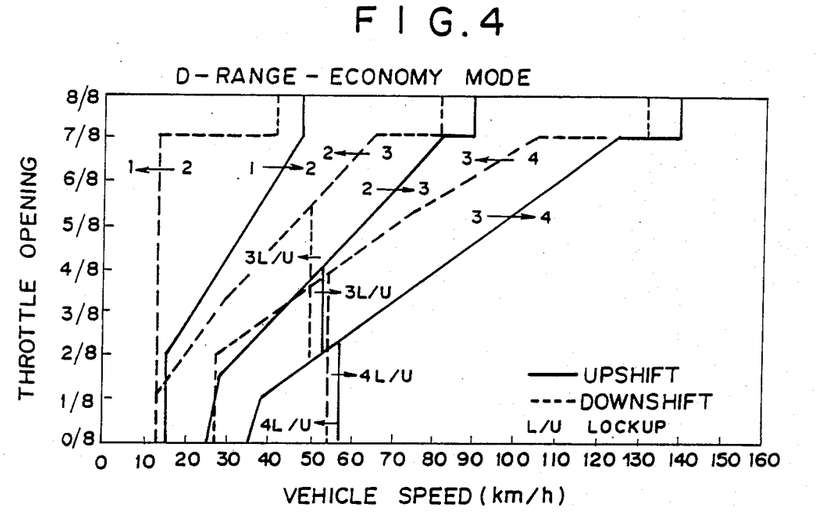
FIGS. 4 to 10 are gear-shifting maps for different ranges and different modes.
Figure 5:
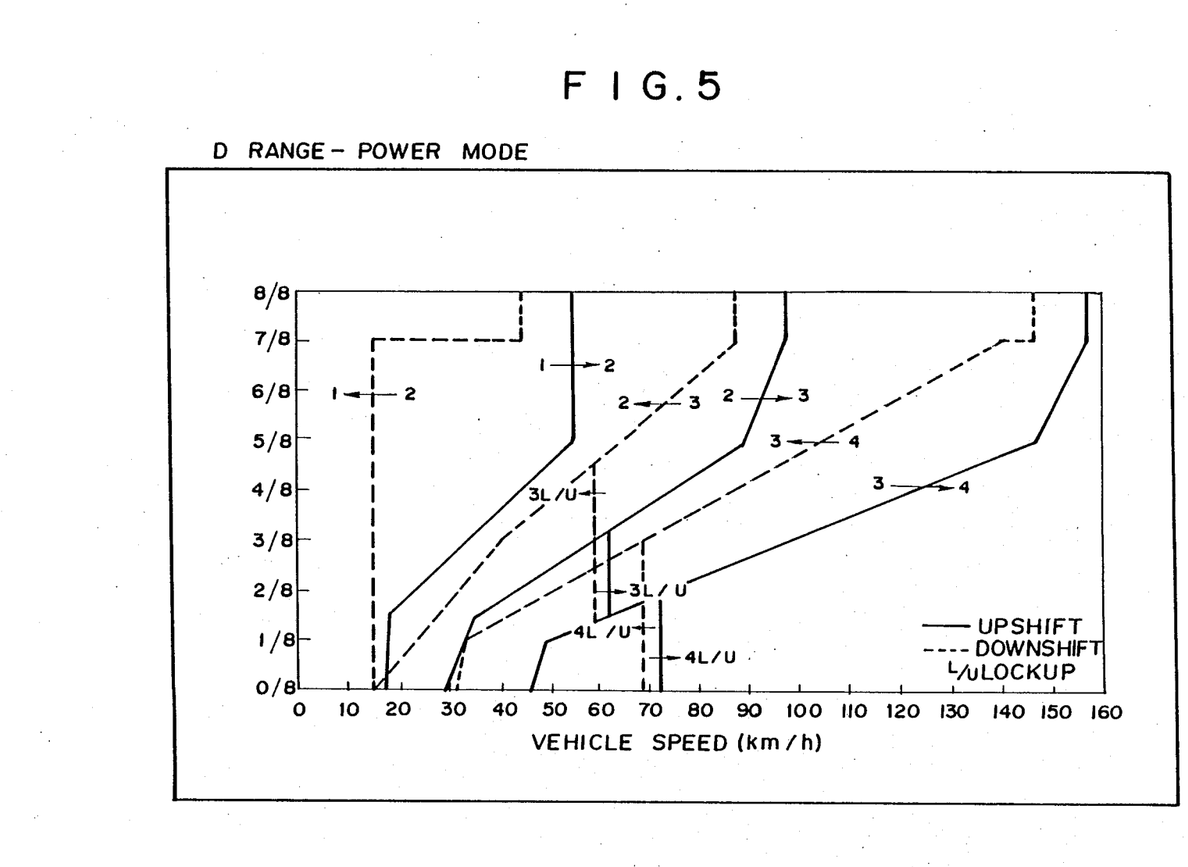
Figure 6:
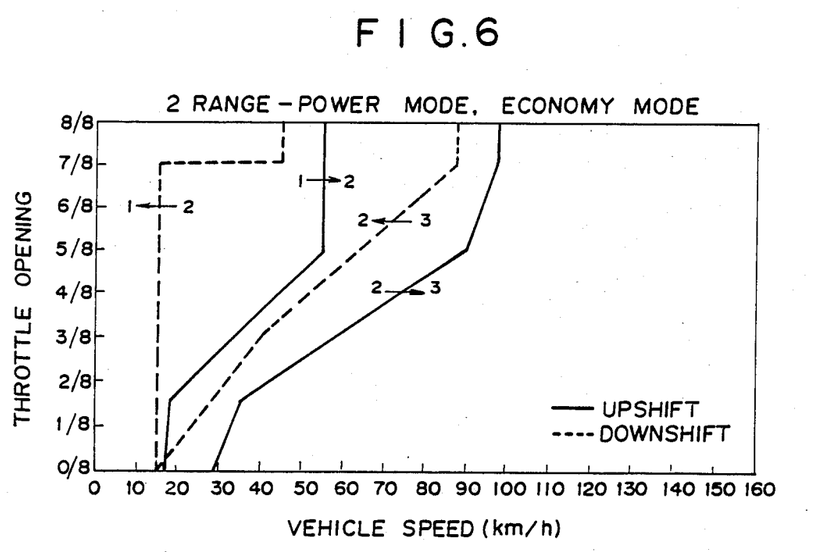
Figure 7:
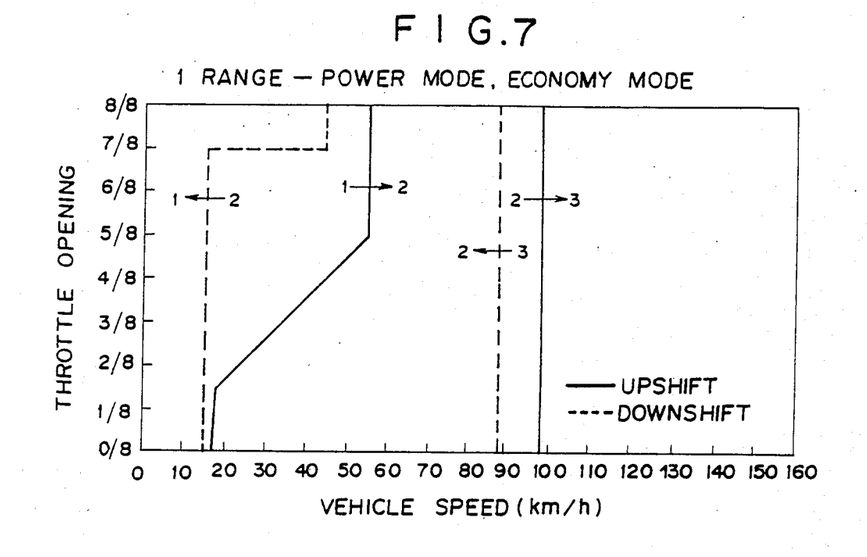

As shown in FIG. 3, the cutback valve 97 is provided with a spool 97a and first to third ports 97b to 97d. The spool 97a is formed of a left half 97a-1 and a right half 97a-2, and is urged leftward by a spring 97e which acts on the right end face of the right half 97a-2. The cutback valve 97 is connected to a line 142 which branches off from the line 141 through which the throttle modulator pressure if applied to the regulator valve 61. A pilot pressure which is generated when the first solenoid valve 66 is off is applied to the first port 97b by way of a line 143, a pilot pressure which is generated when the second solenoid valve 67 is off is applied to the second port 97c by way of a line 144, and a pilot pressure which is generated when the third solenoid valve 68 is off is applied to the third port 97d by way of a line 145. The spool 97a is moved according to the pilot pressure applied thereto, and when the right half 97a-2 is moved leftward, the cutback control is effected, i.e., the line pressure is reduced.

When the transmission is in first of D range or 2 range, only the first solenoid valve 66 is off and the pilot pressure is applied only to first port 97b. Accordingly, the right half 97a-2 of the spool 97a is moved rightward overcoming the force of the spring 97e.

When the transmission in second of D range, all the solenoid valves are on and all the pilot pressures are drained. Accordingly, the right half 97a-2 is moved leftward together with the left half 97a-1 under the force of the spring 97e.

When the transmission is in third of D range or 2 range, the second and third solenoid valves 67 and 68 are off and the pilot pressures are applied to the second and third ports 97c and 97d. In this case, the pilot pressures applied to the second and third ports 97c and 97d cancel each other, and the right half 97a-2 is moved leftward together with the left half 97a-1 under the force of the spring 97e.

When the transmission is in fourth of D range, only the solenoid valve 68 is off and the pilot pressure is applied only to the second port 97c. In this case, the pilot pressure acts together with the force of the spring 97e to move leftward the left and right halves 97q-1 and 97a-2.

When the transmission is in second of 2 range or 1 range, only the third solenoid valve 68 is off and the pilot pressure is applied only to the third port 97d. The pilot pressure applied to the third port 97d overcomes the force of the spring 97e and moves rightward the left and right halves 97a-1 and 97a-2.

When the transmission is in first of 1 range, the first and third solenoid valves 66 and 68 are off and the pilot pressures are applied to the first and third ports 97b and 97d. The pilot pressures overcome the force of the spring 97e and moves rightward the right half 97a-2 together with the left half 97a-1.

That is, the line 142 is closed and the cutback control is effected when the transmission is in first of D range, first or second of 2 range, or first or second of 1 range. When the transmission is in other gear speeds, the line 142 is communicated with a line 146 and the throttle modulator pressure is applied to a pressure reduction port 61b of the regulator valve 61, whereby the line pressure is reduced, i.e., the cutback control is effected.

The hydraulic control circuit is further provided with a bypass valve 101, a 2-3 control valve 102 and a timing valve 103 in addition to the coast control valve 83 in order to adjust the timing of feed and discharge of hydraulic pressure during each gear-shifting.

As described above, the coast control valve 83 is provided in the line 127 which branches off from the servo release line 126 and is communicated with the coast clutch line 128 by way of the ball valve 85. The line pressure (forward clutch pressure) is applied to one end of the spool 83a of the coast control valve 83 by way of a line 147 which branches off from the forward clutch line 116. When the servo release pressure applied to the other end of the spool 83a by way of the line 127 and the force of the spring urging the spool 83a overcome the line pressure, the coast control valve 83 opens the line 127. Accordingly, when the transmission upshifts from second to third with the selector lever in D range or 2 range, when the coast clutch pressure is applied to the coast clutch 21 by way of the line 127, the coast clutch 21 cannot be applied until the servo release pressure sufficiently rises, that is, until the 2-4 brake is completely released. Thus the 2-4 brake 23 and the coast clutch 21 are prevented from being simultaneously applied. That is, the double locking is prevented. Since the line pressure is applied to the end of the spool 83a, the timing of opening the line 127 is changed according to the line pressure, whereby the timing of opening the line 127 is properly set with respect to the pressure level of the servo release pressure.

Said bypass valve 101 is provided in a bypass line 148 which bypasses the one-way orifice 76 provided in the 3-4 clutch line 121. The hydraulic pressure in the 3-4 clutch line 121 downstream of the one-way orifice 76 (3-4 clutch pressure) is applied to one end of the spool 101a of the bypass valve 101, and the throttle modulator pressure is applied to the other end of the spool 101a by way of the lines 149 and 150 which are led from the throttle modulator valve 95 so that the bypass line 148 is closed when the 3-4 clutch pressure rises above a predetermined value and the spool 101a is moved leftward. Accordingly, the 3-4 clutch pressure is quickly fed through the bypass line 148 at the beginning but, thereafter, is gently fed by virtue of the one-way orifice 76. The timing of application of the 3-4 clutch 27 during the 2-3 upshift is thus adjusted and is changed according to the throttle opening.

Said 2-3 control valve 102 is provided in a bypass line 151 which bypasses the one-way orifice 81 provided in the servo release line 126 to throttle the hydraulic pressure in the feeding direction. The hydraulic pressure in the 3-4 clutch line 121 (3-4 clutch pressure) is applied to one end of the spool 102a of the bypass valve 102, the throttle modulator pressure is applied to the intermediate portion of the spool 102a by way of the lines 149 and 152, and the servo release pressure downstream of the bypass line 151 is applied to the other end of the spool 102a. The bypass line 151 is opened or drained by the effect of the 3-4 clutch pressure, the throttle modulator pressure and the servo release pressure, whereby the servo release pressure is regulated according to the 3-4 clutch pressure.

The timing valve 103 is provided across a first bypass line 153 which bypasses the one-way orifice 73 in the servo application line 120, a second bypass line 154 which bypasses the one-way orifices 81 and 82 in the servo release line 126, and a third bypass line 155 which bypasses the fixed orifice 78 and the one-way orifice 79 in the second drain line 123. A pilot line 157 which is led from the main line 110 by way of a line 156 is connected to the spool 103a of the timing valve 103, and a fifth solenoid valve 104 is provided in the pilot line 157.

The timing valve 103 is actuated by the fifth solenoid valve 104, and selectively closes and opens the first to third bypass lines 153 to 155 upon the 1-2 upshift, the 3-2 downshift and the 4-2 downshift, thereby controlling the timing of feed and discharge of the hydraulic pressure during these gear-shiftings.

Figure 9:
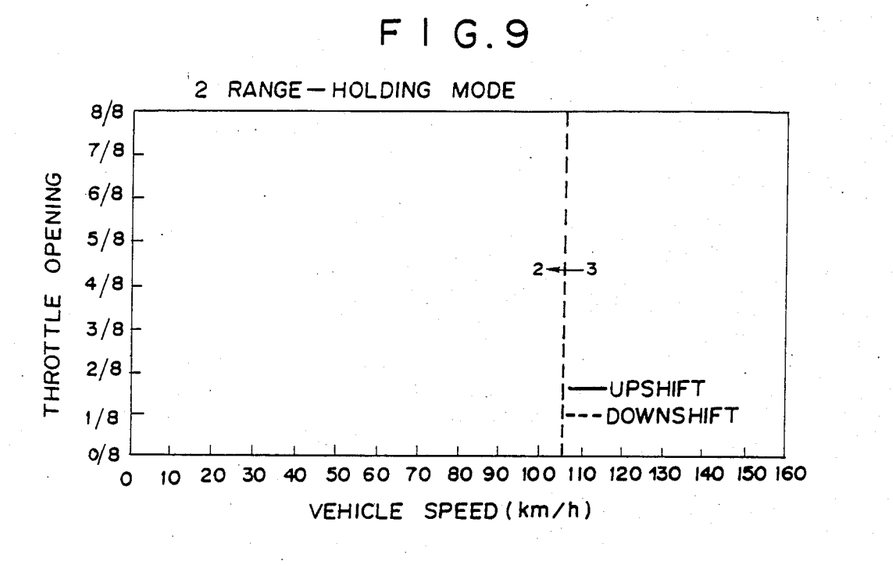
Figure 10:
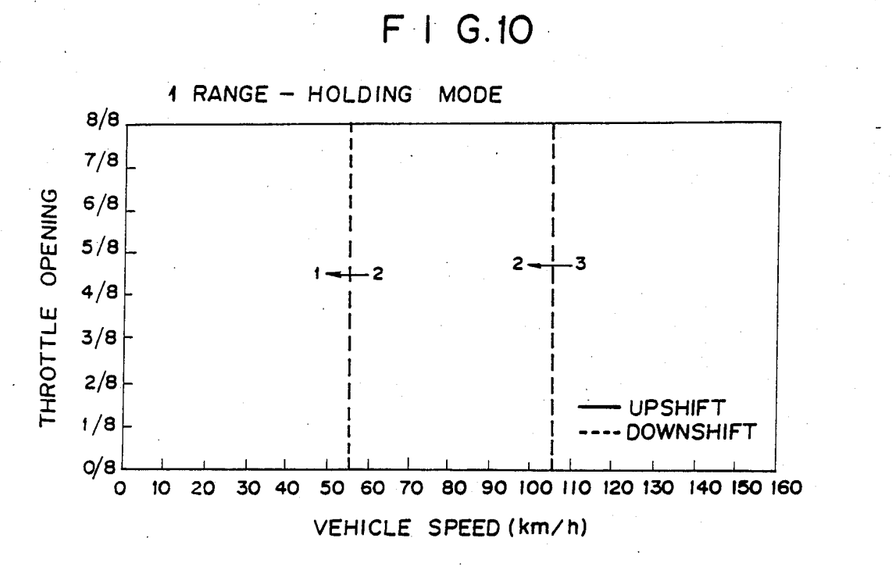

As shown in FIG. 1, the control unit X receives signals from a throttle opening detecting means, a vehicle speed sensor and a turbine speed sensor, and determines the gear-speed according to the operating condition of the vehicle on the basis of predetermined gear-shifting maps stored therein. Then control unit X outputs control signals A1, A2, A3 and A4 to the solenoid valves 66 to 68 and 94, thereby controlling the solenoid valves so that the transmission is shifted to the desired gear-speed. Further, the transmission shown in FIG. 1 has a power mode, an economy mode and a holding mode which can be manually selected by operation of a mode selection switch Y. When the power mode or the economy mode is selected with the range selector lever in D, the gear-shifting is carried out in the range of first to fourth gear-speeds, when the power mode or the economy mode is selected with the range selector lever in 2, the gear-shifting is carried out in the range of first to third gear-speeds, and when the power mode or the economy mode is selected with the range selector lever in 1, the gear-shifting is carried out in the range of first and second gear-speeds as can be understood from the gear-shifting maps shown in FIGS. 4 to 7. On the other hand, when the holding mode is selected, the gear-speed is normally fixed to third (D range), second (2 range) or first (1 range) though the transmission is shifted down when the vehicle speed is reduced below a predetermined speed as can be understood from the gear-shifting maps shown in FIGS. 8 to 10.

Figure 8:
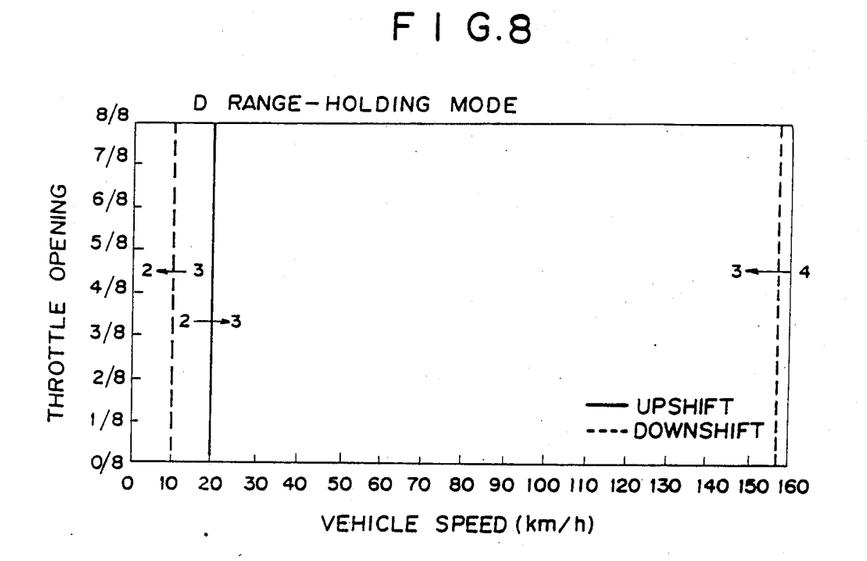

As can be understood from FIG. 8, when the holding mode is selected with the range selector lever in D, the transmission is shifted to down to second when the vehicle speed is lower than 10 Km/h. Accordingly, when the vehicle started in this condition, the transmission is in second of D range. As described above, in second of D range, the cutback control is effected and the line pressure is reduced. This will deteriorates the starting performance. In order to avoid such a problem, in this particular embodiment, the control unit X controls the solenoid valves 66 to 68 in the pattern for second in 2 range when the vehicle is starting with the transmission in second and the holding mode selected. That is, if the solenoid valves 66 to 68 are controlled in the pattern for second in D range, all the solenoid valves 68 are on (table 2) and accordingly, the cutback control is effected. On the other hand, when the solenoid valves 66 to 68 are controlled in the pattern for second in 2 range, the first and second solenoid valves 66 and 67 are on with the third solenoid valve 68 off, and accordingly, the cutback control is not effected. For this purpose, the control unit X is provided with a start detecting means which detects that the vehicle is starting through the rpm of the turbine (vehicle speed), and a holding mode detecting means which receives a signal from the mode selection switch and detects that the holding mode is selected.

Figure 11:
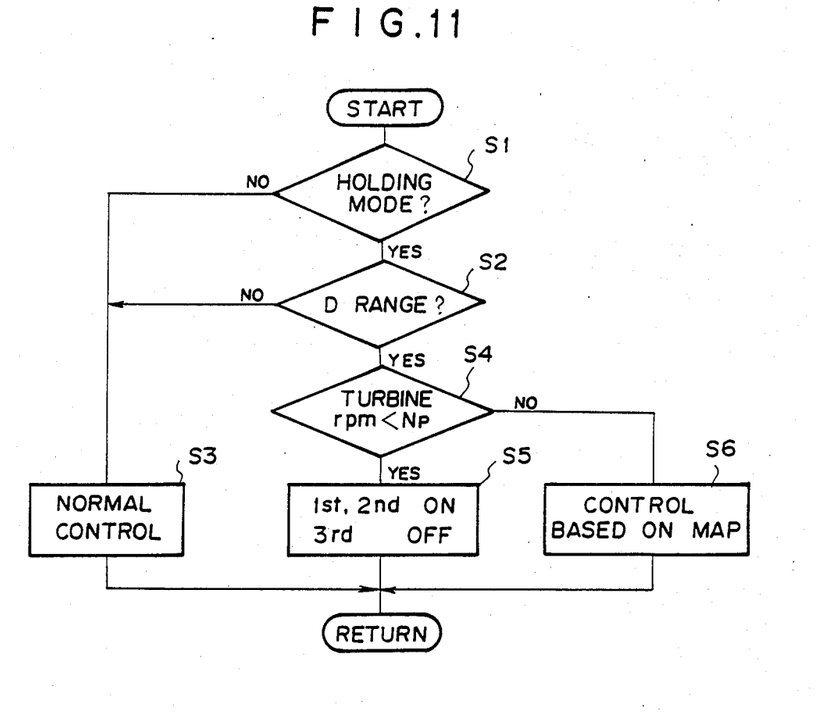
FIG. 11 shows a flow chart for illustrating operation of the control unit when the vehicle is starting with the holding mode selected.

FIG. 11 shows a flow chart for illustrating the operation which the control unit performs in order to inhibit the cutback control when the vehicle is starting with the transmission in second and the holding mode selected. In step S1, the control unit X determines whether the holding mode has been selected. When it is determined that the holding mode has been selected, the control unit X determines in step S2 whether D range has been selected. When it is determined in step S2 that D range has been selected, the control unit X determines in step S4 whether the turbine rpm is lower than a predetermined value Np. When it is determined that the turbine rpm is lower than the predetermined value Np, the control unit X controls the solenoid valves 66 to 68 in the pattern for second in 2 range (i.e., the first and second solenoid valves 66 and 67 on with the third solenoid valve 68 off). (step S5) On the other hand, when it is determined that the turbine rpm is not lower than the predetermined value Np, the control unit X controls the solenoid valves 66 to 68 in the pattern based on the map shown in FIG. 8. When it is determined that the holding mode has not been selected in step S1 or when it is determined that D range has not been selected, the control unit X performs the normal solenoid control.

Figure 12:
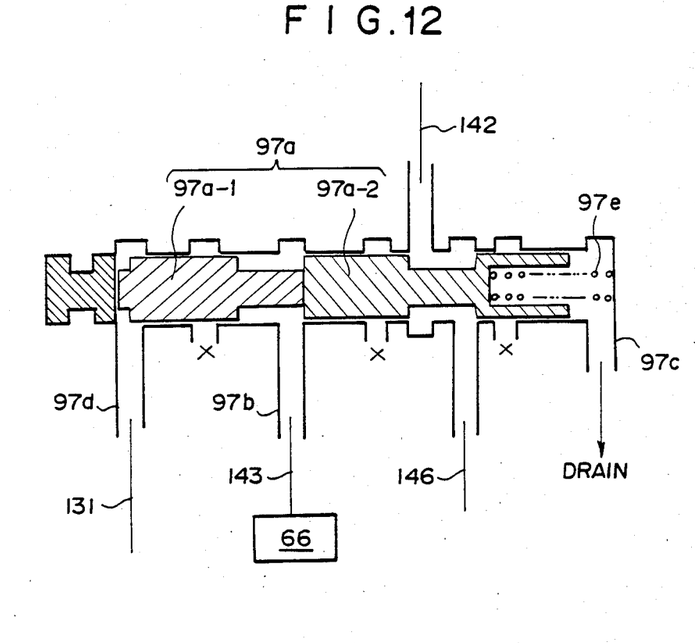
FIG. 12 is a view similar to FIG. 3 but showing a modification of connection of the cutback valve.

FIG. 12 shows a modification of the connection of the cutback valve 97 to the hydraulic control circuit. In the modification, the second port 97c is drained instead of being connected to the line 144, and the third port 97d is connected to the line 131 instead of the line 145. Thus, the hydraulic pressure is applied to the third port 97d through the line 131 when the transmission is in second of 2 range or first or second of 1 range.

In this modification, when the transmission is in first of D range or 2 range, only the first solenoid valve 66 is off and the pilot pressure is applied only to first port 97b with no hydraulic pressure fed to the line 131. Accordingly, the right half 97a-2 of the spool 97a is moved rightward overcoming the force of the spring 97e.

When the transmission in second of D range, all the solenoid valves are on and both the first and third ports 97b and 97d are drained. Accordingly, the right half 97a-2 is moved leftward together with the left half 97a-1 under the force of the spring 97e.

When the transmission is in third of D range or 2 range, the second and third solenoid valves 67 and 68 are off with the first solenoid valve 66 on. In this case, no hydraulic pressure is fed to the line 131 and both the first and third ports 97b and 97d are drained, whereby the right half 97a-2 is moved leftward together with the left half 97a-1 under the force of the spring 97e.

When the transmission is in fourth of D range, only the solenoid valve 68 is off and both the first and third ports 97b and 97d are drained. In this case, the left and right halves 97a-1 and 97a-2 are moved leftward under the force of the spring 97e.

When the transmission is in second of 2 range or 1 range, only the third solenoid valve 68 is off and the hydraulic pressure is applied to the third port 97d by way of the line 131 with no pilot pressure applied to the first port 97b. The hydraulic pressure applied to the third port 97d overcomes the force of the spring 97e and moves rightward the left and right halves 97a-1 and 97a-2.

When the transmission is in first of 1 range, the first and third solenoid valves 66 and 68 are off and the pilot pressures are applied to the first and third ports 97b and 97d. The pilot pressures overcome the force of the spring 97e and moves rightward the right half 97a-2 together with the left half 97a-1.

We claim:

1. A hydraulic control system for an automatic transmission of a vehicle which has a transmission gear mechanism having at least a lower gear-speed and a higher gear-speed, and first and second friction coupling members which are applied or released by hydraulic pressures applied thereto, the first friction coupling member being kept applied when the transmission is in the lower gear speed and the second friction coupling member being kept applied when the transmission is in the higher gear-speed, the control system including a hydraulic control circuit which controls the hydraulic pressure applied to the respective friction coupling members, thereby changing the condition of application of the friction coupling members and causing the automatic transmission to shift and a control means which controls the hydraulic control circuit according to the running condition of the vehicle, characterized in that said control means includes an application pressure changing means which makes lower the hydraulic pressure applied to the second friction coupling member when it is kept applied than that applied to the first friction coupling member when it is kept applied by a predetermined value, a detecting means which detects that the vehicle is starting with the transmission in the higher gear-speed, and an inhibiting means which inhibits the application pressure changing means from making lower the hydraulic pressure applied to the second friction coupling member when it is kept applied than that applied to the first friction coupling member when it is kept applied when the detecting means detects that the vehicle is starting with the transmission in the higher gear-speed.

2. A hydraulic control system as defined in claim 1 in which said application pressure changing means comprises a cutback valve which makes lower the hydraulic pressure applied to the second friction coupling member by communicating the hydraulic passage through which the hydraulic pressure is applied to the friction coupling member with the pressure reduction port of a regulator valve which regulates the line pressure.

3. A hydraulic control system as defined in claim 2 in which said cutback valve has a spool which is moved under a pilot pressure applied thereto to a cutback position in which it communicates a first port with a second port, the first port being connected to the hydraulic passage through which the hydraulic pressure is applied to the friction coupling member, the second port being connected to the pressure reduction port of the regulator valve.

4. A hydraulic control system as defined in claim 3 in which said inhibiting means inhibits the spool from moving to the cutback position.

* * * * *